United States Patent [19]
Tamura

[11] 3,864,694
[45] Feb. 4, 1975

[54] RECORDING INSTRUMENTS
[75] Inventor: Sadao Tamura, Tokyo, Japan
[73] Assignee: Yokogawa Electric Works, Limited, Tokyo, Japan
[22] Filed: Feb. 28, 1973
[21] Appl. No.: 336,480

Related U.S. Application Data
[63] Continuation of Ser. No. 130,715, April 2, 1971, abandoned.

[30] Foreign Application Priority Data
Apr. 7, 1970  Japan.............................. 45-29016
Dec. 14, 1970  Japan............................ 45-111507

[52] U.S. Cl.................................. 346/136, 346/140
[51] Int. Cl...................... G01d 15/30, G01d 15/16
[58] Field of Search..................... 346/136, 140, 145

[56]  References Cited
UNITED STATES PATENTS
| | | | |
|---|---|---|---|
| 2,321,273 | 6/1943 | Belcher........................... | 346/136 X |
| 2,446,400 | 8/1948 | Woolley........................ | 346/136 X |
| 2,663,609 | 12/1953 | Jones............................ | 346/136 X |
| 3,438,049 | 4/1969 | Polster.......................... | 346/136 X |
| 3,579,248 | 5/1971 | McGrath....................... | 346/136 X |

Primary Examiner—Joseph W. Hartary
Attorney, Agent, or Firm—Dike, Bronstein, Roberts, Cushman & Pfund

[57]  ABSTRACT

In a recording instrument of the type comprising driving means, a continuous web of recording paper which is folded in many folds before and after recording, means driven by the driving means for continuously feeding the recording paper in an unfolded condition, and means for recording a measured quantity on the recording paper while it is unfolded, there is provided means for directing the folds of the recording paper alternately in opposite direction after recording to forcibly fold the recorded paper. There are also provided a removable cassette type recording paper container from which a folded recorded paper is payed out, recorded and again contained therein after recording; an improved interchangeable gear unit designed to drive the recording paper at the same speed by an AC or DC motor operating at different speeds; mounting means for removably mounting the recording paper container in a definite position to assure correct recording; a removable cartridge-type ink container for supplying ink to the recording pen; and a ink pot for supplementing ink to the ink container.

9 Claims, 30 Drawing Figures

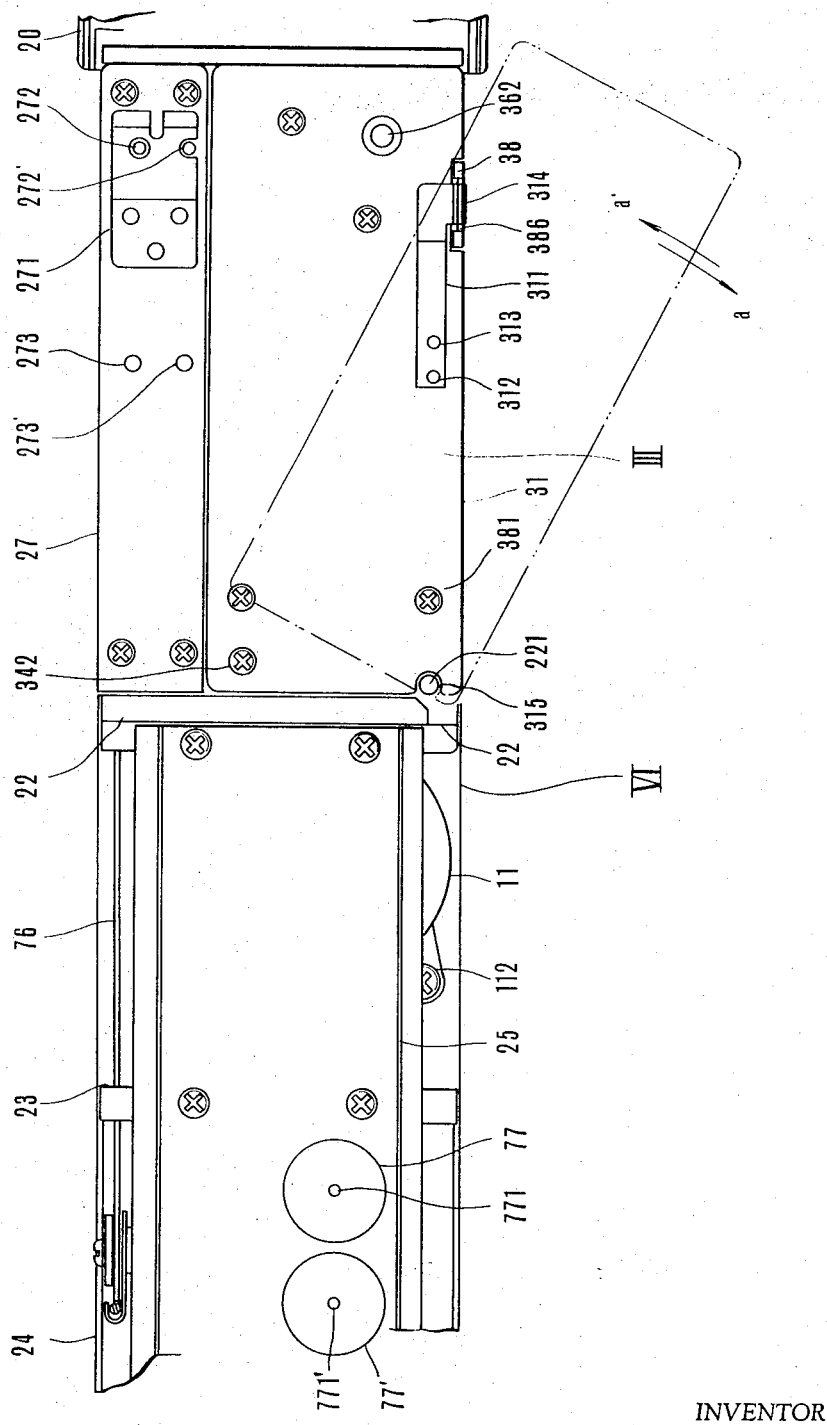

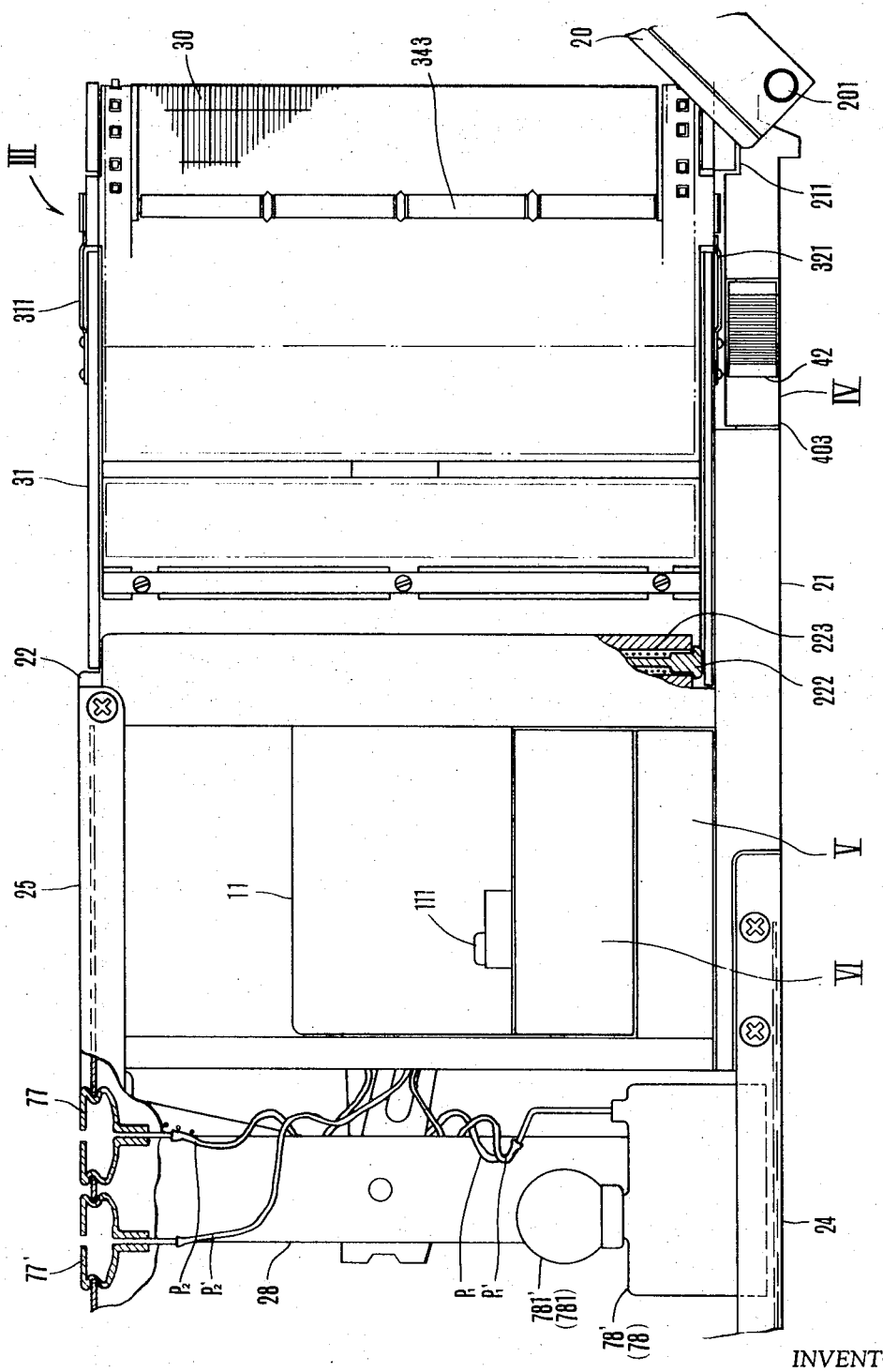

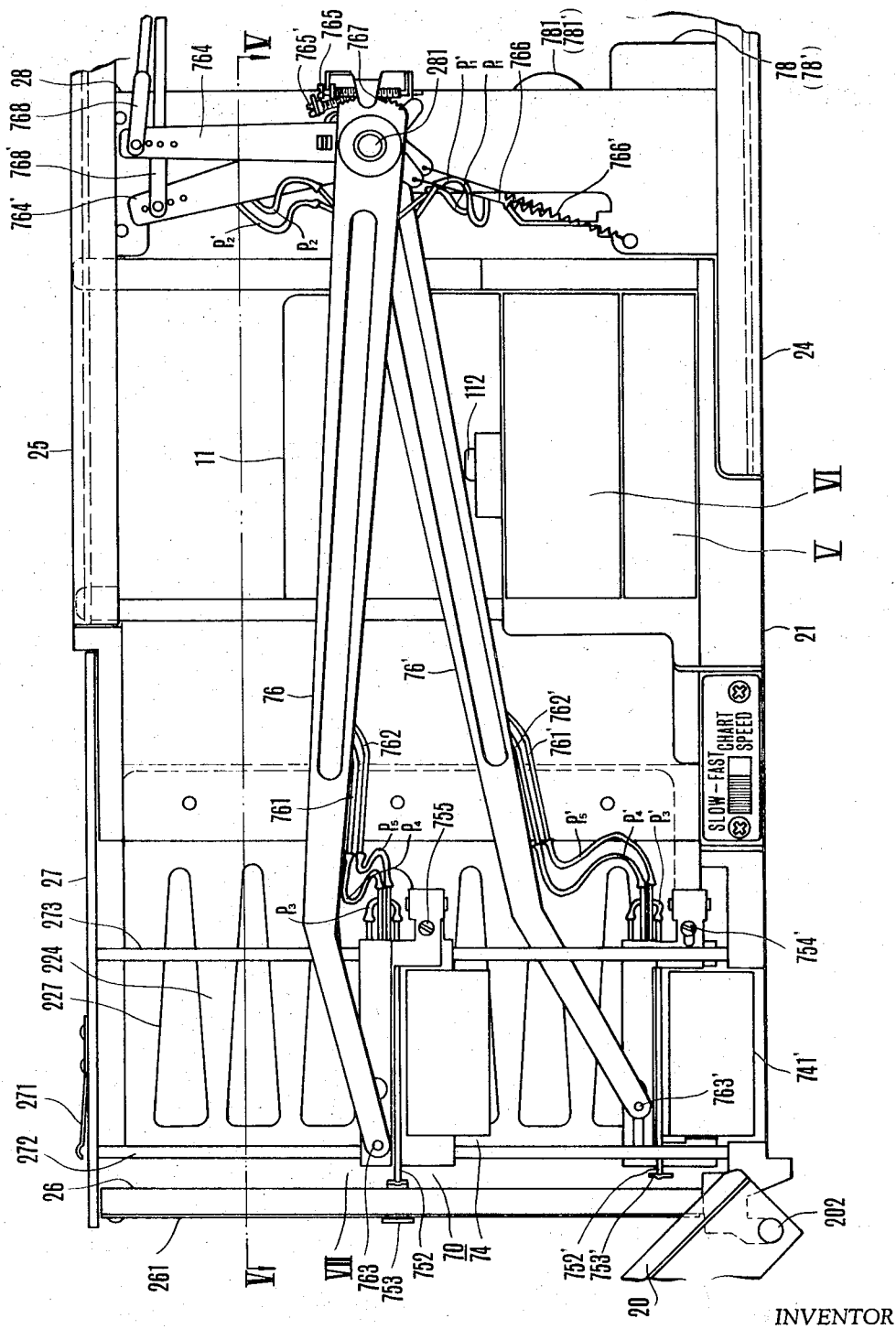

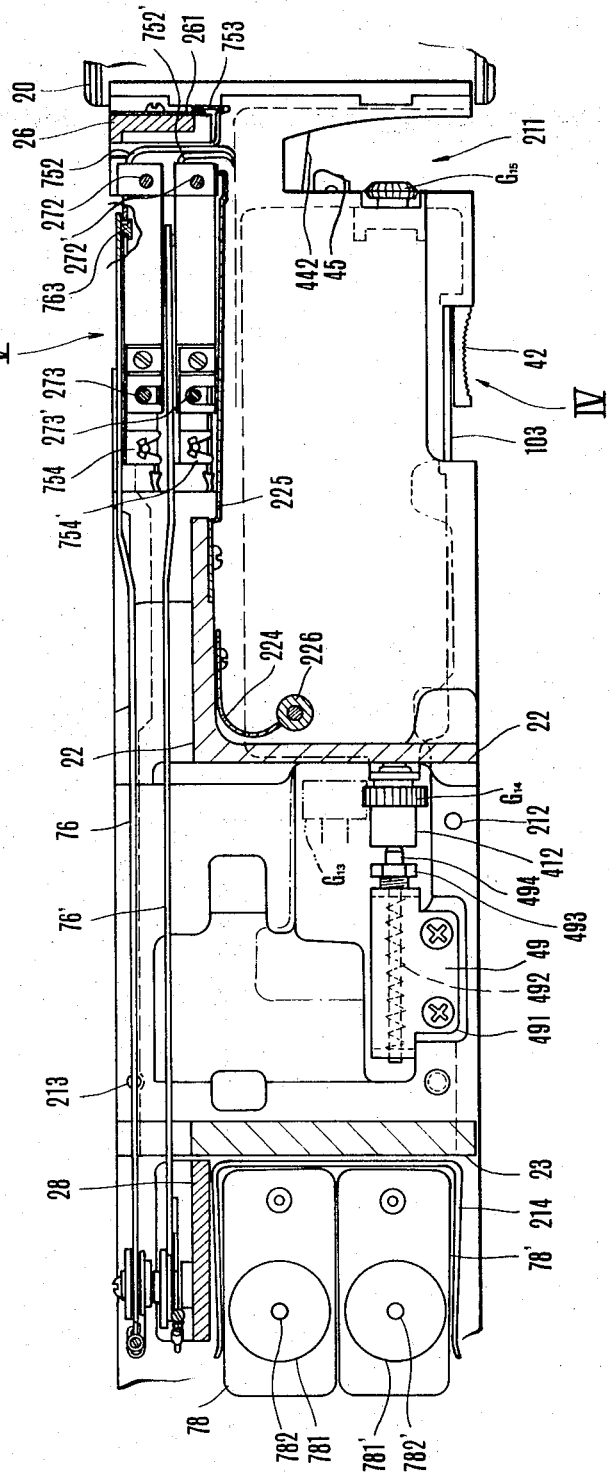

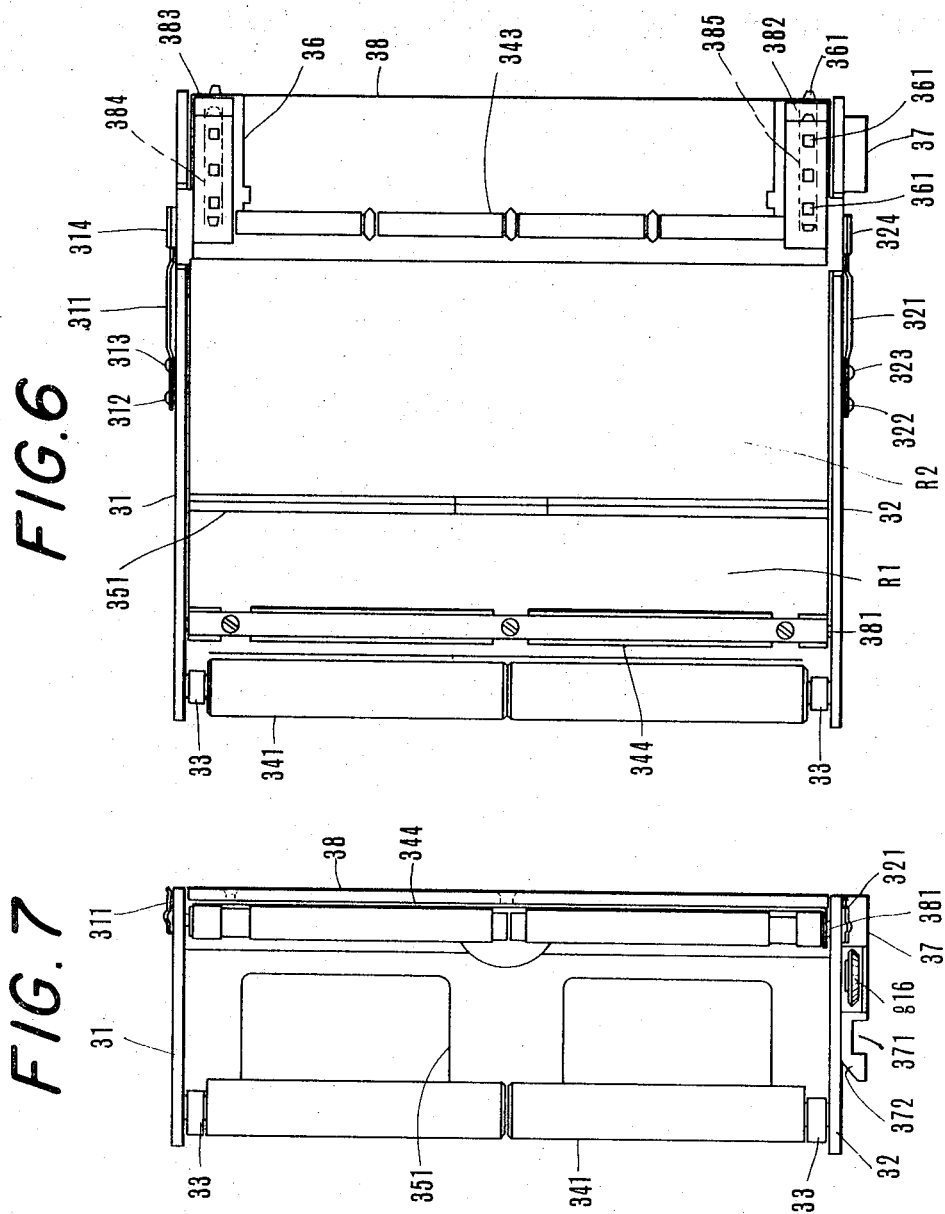

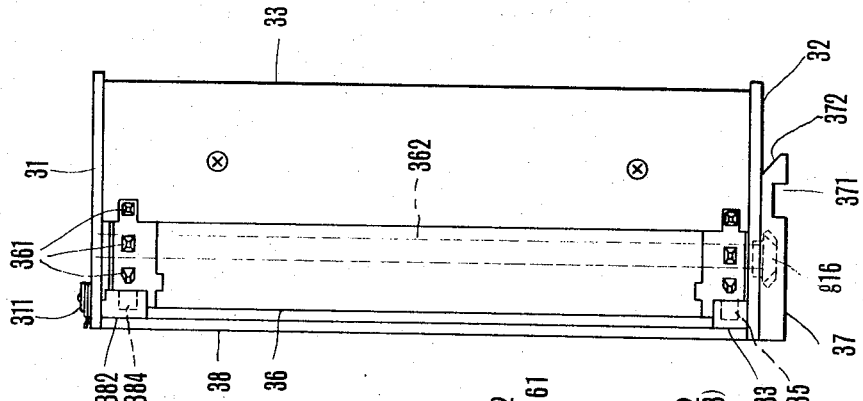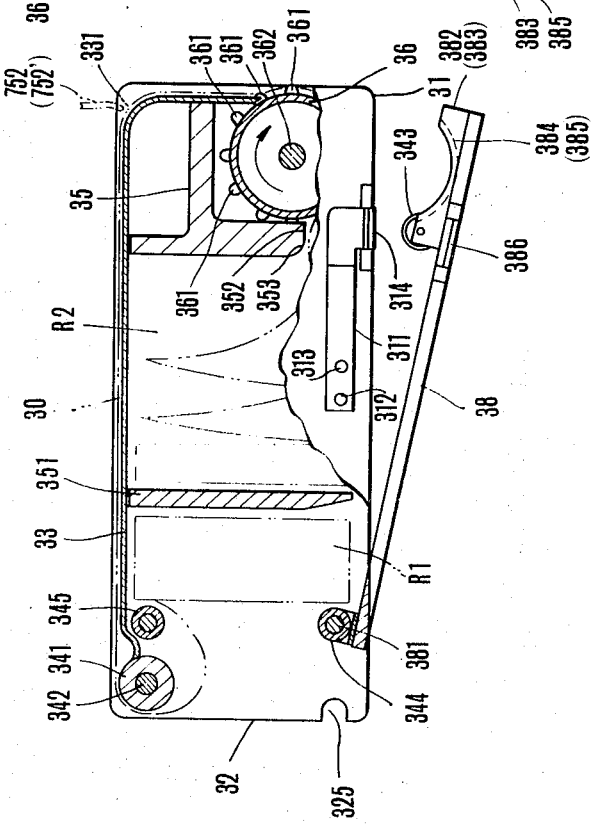

INVENTOR
SADAO TAMURA

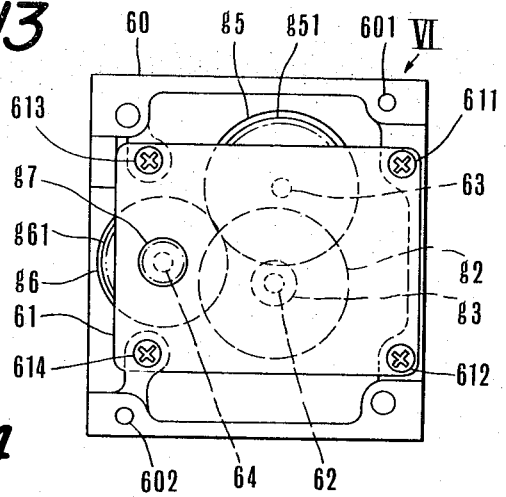
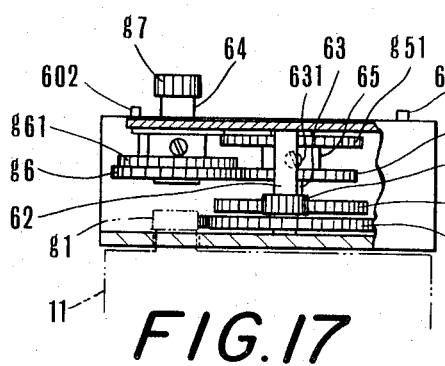
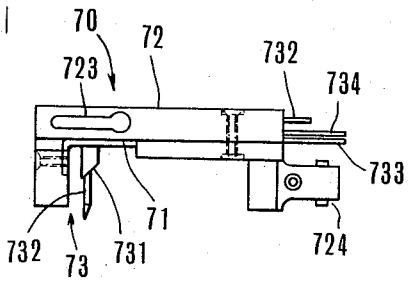
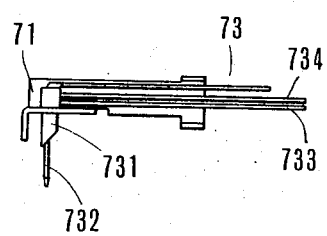

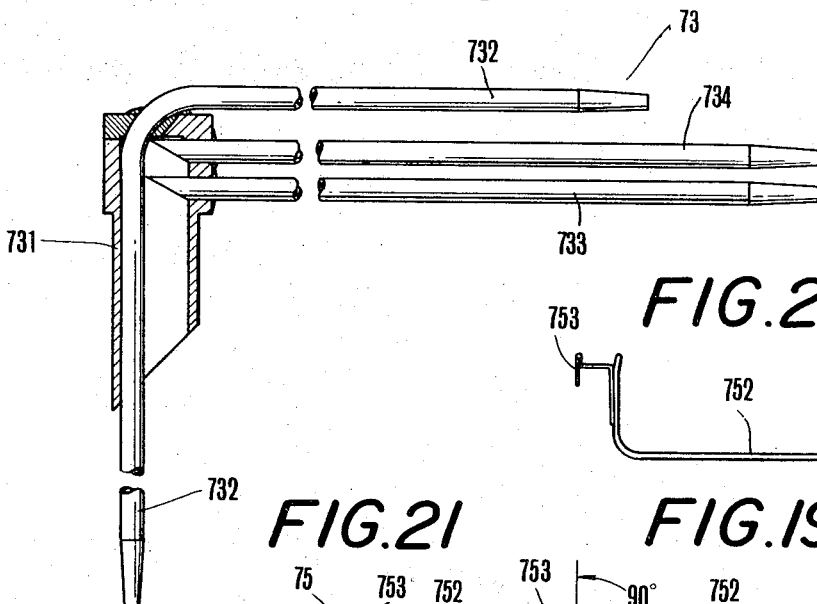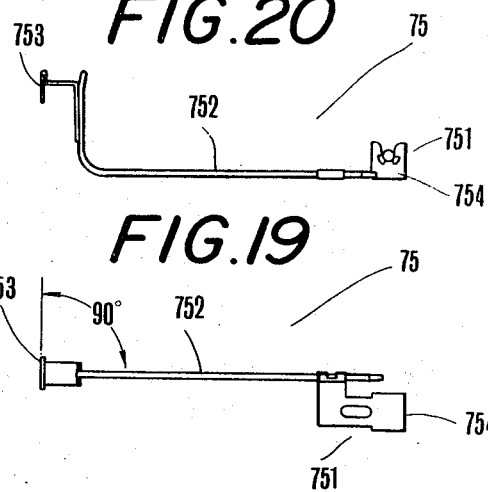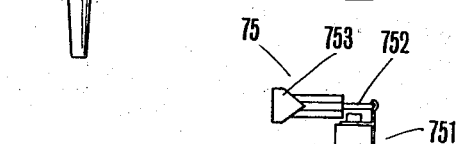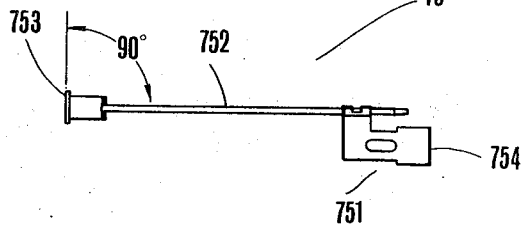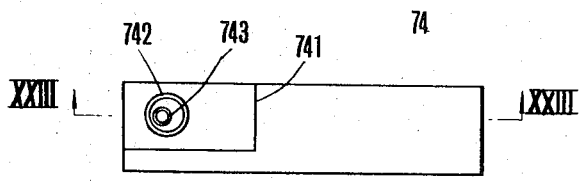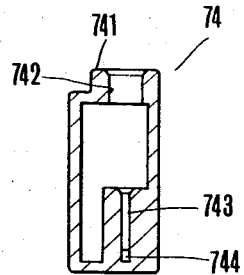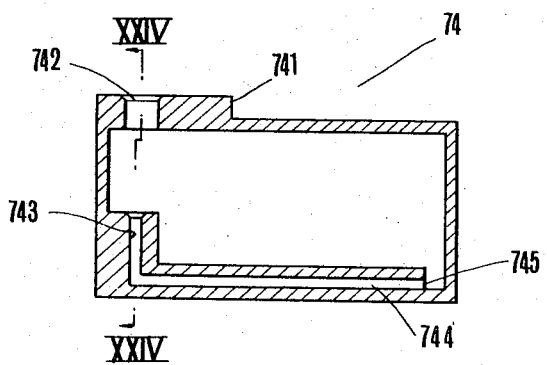

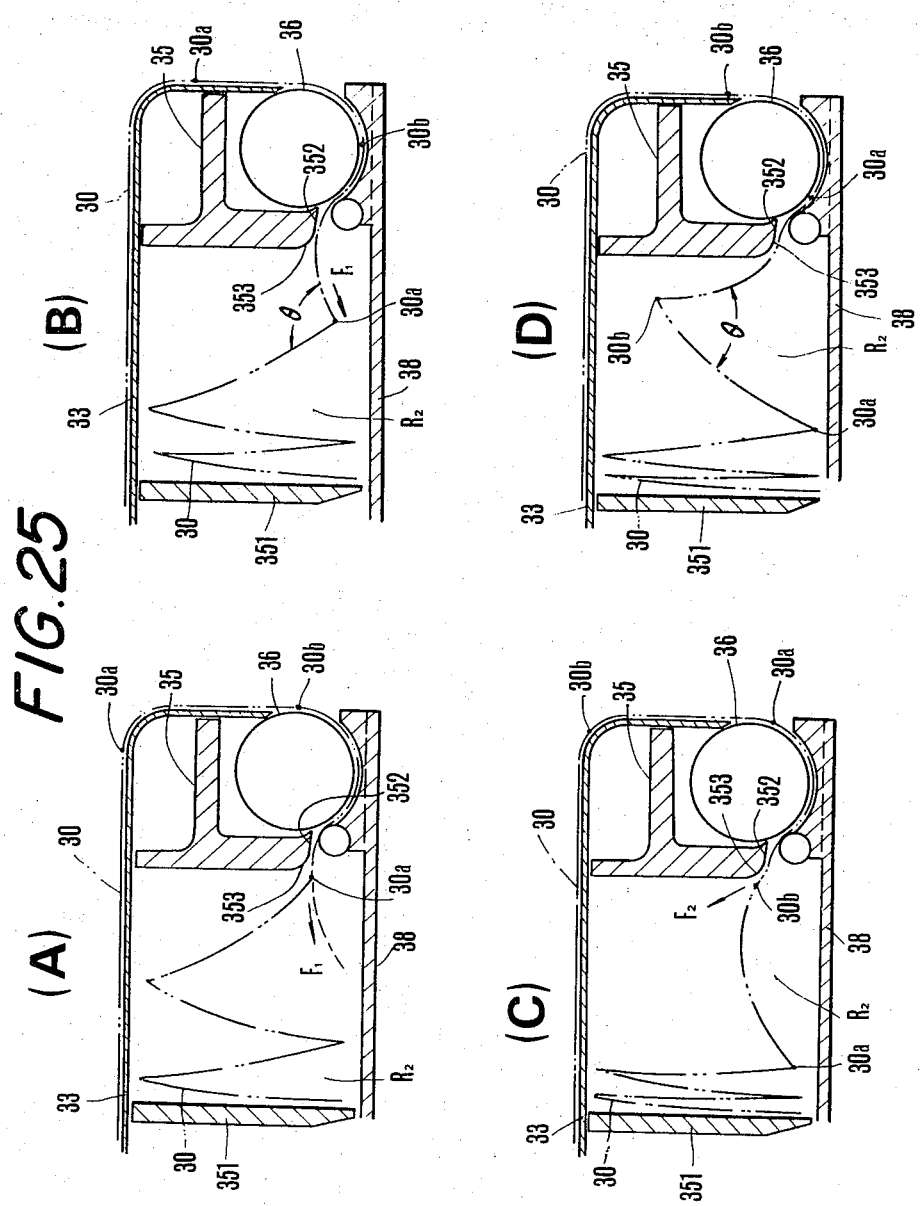

INVENTOR
SADAO TAMURA

RECORDING INSTRUMENTS

This is a continuation of application Ser. No. 130,715, filed Apr. 2, 1971, now abandoned.

BACKGROUND OF THE INVENTION

This invention relates to a recording instrument utilizing folded recording papers.

When compared with a continuous recording paper payed out from a roll, a folded recording paper utilized in recording instruments is more advantageous in that observation or comparison of the recorded data is easy and that filing or storage of the paper is also easy because it is folded in a zigzag configuration. Heretofore, the so-called self weight-type folding system hss been used for folding the recorded paper wherein the weight of the recording paper is used to fold it in the zigzag configuration. As this type of folding system requires a relatively large space to permit the recorded paper to fall down by its weight, the size of the recording instrument is large thus making it difficult to miniaturize the instrument. It is also necessary to provide a horizontal storage box near the front bottom portion of the instrument having an area slightly larger than the area of the folded recording paper.

The scale of modern industrial plants is becoming larger as in petroleum or chemical plants so that it is highly desirable to mount a number of instruments on an instrument panel at a high density. To this end, vertical-type instruments are preferred rather than horizontal-type instruments wherein the recording pens are moved is the horizontal direction across the recording papers. In the vertical-type instrument (in which the recording pen is moved in the vertical direction), however, as the recording paper is fed horizontally it is impossible to adopt the self weight-type folding system. Accordingly, it has been obliged to use the roll-type recording paper which is inconvenient as above described. Improvements have also been made in the construction of the instrument panel board. For example, according to one design, the portion of the panel board about one meter above the floor level is made vertical as in the conventional design, while the lower portion is inclined 30° to 75° with respect to the vertical to make easy the handling of the instruments mounted on the lower portion.

Where recording instruments designed to be normally mounted on vertical panel boards are mounted on such inclined panel boards certain troubles arise. For example, the operation of the recording mechanism utilizing liquid ink becomes irregular.

If the recording paper is contained in a container or magazine which can be readily mounted on or dismounted from the instrument like a photographic film contained in a magazine it is possible to promptly exchange or dismount the recording paper. Of course, the more the size of the container is small, the more it is convenient to use.

SUMMARY OF THE INVENTION

It is an object of this invention to provide a novel recording instrument wherein a recorded paper is sent into a storage box by preshaping it into a readily foldable configuration by feeding it along a suitable guide so as to forcibly fold the recording paper instead of folding it by utilizing its own weight as in the prior self weight-type folding system. This not only makes possible extreme miniaturization of the instrument but also increases the freedom of the design.

Another object of this invention is to provide a convenient recording instrument utilizing a demountable compact cassette for accommodating the forcibly folded recorded paper in combination with the guide mentioned above.

Still another object is to provide a novel recording instrument which can be constructed as either the horizontal or vertical type by utilizing the guiding and folding mechanism described above, and which is especially suitable to be constructed as the vertical type for mounting on a panel board at a high density.

A further object of this invention is to provide a new and improved recording instrument provided with a cassette-type recording paper container which can be readily mounted and dismounted and firmly held in position in the instrument by a novel mechanism such that the relative position between the recording paper and the recording pen is always maintained constant to assure accurate recording.

A further object of this invention is to provide a novel torque transmission device for feeding the recording paper which is suitable for use in the vertical-type recording instrument provided with the cassette-type recording paper container. A more specific object of this invention is to construct as a unit the variable speed gear mechanism of the torque transmission mechanism whereby to provide a convenient recording instrument which can be driven either by a conventional synchronous motor or a pulse motor by incorporating or removing such a gear unit.

Another object of this invention is to provide a new and improved recording instrument utilizing a dual tank-type ink supply system including a cartridge-type ink container and an ink pot having a larger volume than the cartridge so that it is possible to readily supplement the ink into the cartridge from the pot.

Yet another object of this invention is to provide a novel ink supply device including an ink container of a special design which enables complete use of the ink even when the instrument is mounted on an inclined panel board.

As above described, this invention relates to improvements of a recording instrument fo the type comprising torque generating means, a continuous web of recording paper which is folded in many folds before and after recording, means driven by the torque generating means for continuously feeding the recording paper in an unfolded condition, and means for recording a measured quantity on the recording paper while it is unfolded.

According to one respect of this invention there is provided means for directing the oppositely folded portions of the recording paper alternately in, opposite directions after the recording paper has been recorded with the measured quantity to forcibly fold the recorded recording paper. By this means, it becomes possible to feed the recording paper in the horizontal directions.

According to another feature of this invention, there is provided a recording paper container including a first compartment adapted to store the not yet recorded portion of the folded recording paper and a second compartment adapted to house the recorded portion of the recording portion and means provided at the entrance of the second compartment for directing the oppositely folded portions of the recording paper alternately in opposite directions after the recording paper has been recorded with a measured quantity whereby to forcibly fold the recorded portion of the recording paper. A movable partition wall is positioned between the first and second compartment which is biased towards first compartment so as to vary the volumes of the first and second compartments in accordance with the volume of the recording paper is the first and second compartments.

There are provided first and second gear mechanism units between the torque generating means and the recording paper feeding mechanism. These units are constructed such that the paper can be driven at constant speeds by an AC motor or a DC motor operating at different speeds.

According to another aspect of this invention, there is provided an ink container removably connected to a movable arm supporting a pen. A passage is formed in the bottom of the ink container to always supply ink to the pen from the rear bottom portion of the container so as to assure adequate supply of the ink even when the instrument is mounted on an inclined panel board.

Further an ink pot is provided to supplement ink into the ink container by manipulating a squirt.

BRIEF DESCRIPTION OF THE DRAWINGS

Further objects and advantages of the invention will be more fully understood from the following detailed description taken in conjunction with the accompanying drawings in which:

FIG. 2 shows an upper view of the instrument shown in FIG. 1 with the casing removed and the inside structure pulled out;

FIG. 3 shows a left hand side view of the instrument shown in FIG. 2;

FIG. 4 shows a right hand side view;

FIG. 5 shows a sectional view taken along a line V — V in FIG. 4;

FIGS. 6 through 24 show various component parts of the recording instrument shown in FIGS. 1 to 5 wherein:

FIG. 6 shows one example of the construction of a recording paper container;

FIG. 7 shows a left hand side view of the container shown in FIG. 6;

FIG. 8 shows a right hand side view of the container shown in FIG. 6;

FIG. 9 shows a plan view of the container shown in FIG. 6 with the upper cover partially removed;

FIG. 10 shows a side view of the mounting mechanism;

FIG. 11 shows a bottom view of the second gear mechanism;

FIG. 12 shows a vertical section of the second gear mechanism shown in FIG. 11;

FIG. 13 is a bottom view of the first gear mechanism;

FIG. 14 shows a vertical section of the first gear mechanism shown in FIG. 13;

FIG. 15 is a side view of the movable body of a pen operating mechanism;

FIG. 16 shows a side view of the holder and a pipe assembly utilized in the mechanism shown in FIG. 15;

FIG. 17 shows an upper view of the holder and pipe assembly shown in FIG. 16;

FIG. 18 is an enlarged view of the pipe assembly shown in FIG. 16;

FIG. 19 shows the detail of a recording pen;

FIG. 20 is an upper plan view of the recording pen shown in FIG. 19;

FIG. 21 is a left-hand side view of the recording pen shown in FIG. 19;

FIG. 22 is an upper plan view of an ink container;

FIG. 23 shows a sectional view of the ink container taken along a line XXIII — XXIII in FIG. 22;

FIG. 24 shows a sectional view of the ink container taken along a line XXIV — XXIV in FIG. 23.

FIGS. 25A to 25 D show the manner of folding a recording paper

DESCRIPTION OF THE PREFERRED EMBODIMENTS

Figure 1:
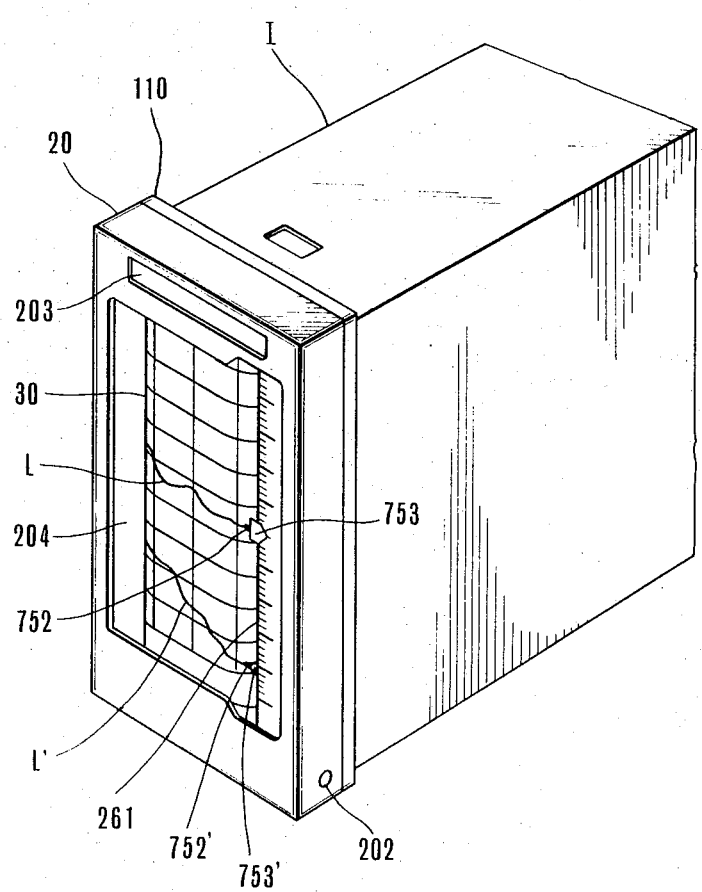
FIG. 1 is a perspective view of one example of the novel recording instrument.

With reference first to FIGS. 1 to 5, a preferred embodiment of the novel recording instrument shown therein comprises an elongated rectangular casing I having a flange 110 on its front end, and an inner frame II for supporting various component parts to be described hereunder. Frame II comprises a base 21 removably supporting a cover 20, a vertical frame 22 and a stationary wall 23 secured to base 21, a bottom plate 24 secured to the rear side of base 21, a cover plate 25 and a bridging or connecting plate 27 for bridging the frame 22 and a plate 26 for mounting a scale 261. Cover 20 is rotatably mounted about pivot pins 201 and 202 and is held in the closed position by the engagement of the inner surface of its upper end and a spring clip 271 secured on the upper surface of bridging plate 27. As shown in FIG. 1, cover 20 is provided with a display window 203 and an observation window 204, the former displaying the tag number and the latter permitting one to observe scale 261, a pointers 753 and 753', two recording pens 752 and 752' and a recording paper 30 from the front side of the instrument. At the upper and lower corners of frame 22 are secured pins 221 and 222 adapted to secure a recording paper container to the frame II as will be described herein below. A coil spring 223 (FIG. 3) is provided for the lower pin 222 to normally bias it to the lower side. Two holding plates 224 and 225 (FIG. 5) of a spring material are secured to frame 22. Holding plate 224 is made of a thin spring plate bent in an arcuate configuration and carries a roller 226 at its free end whereas the other holding plate 225 is made of a wide spring plate with a wedge shaped opening 227 formed by stamping. Both of these holding plates serve to remove a slack in the recording paper 30 on the recording surface to assure smooth feeding of the recording paper.

A reference symbol III designates the recording paper container secured to the inside frame II. As shown in FIGS. 6 to 9, container III comprises an upper plate 31, a lower plate 32, a guide 33 in the form of a partition wall, a first roller 341, a letter T-shaped frame 35 and a partition wall 351 which are disposed between the upper and lower plates 31 and 32. The guide 33 is secured to the shaft 342 of roller 341, frame 35 and partition wall 351 as best shown in FIG. 9. The arcuate corner 331 of guide 33 is disposed to oppose recording pens 752 and 752' with recording paper 30 interposed therebetween when the container II is mounted in the recording instrument. The lower end of frame 35 is formed with a depression 352 and a projection 353 which act to control the direction of feed of the folds of recording paper 30, thus preventing the recording paper from being folded in the opposite direction and assuring correct folding. Beneath frame 35 is provided a sprocket wheel 36 having sprocket teeth 361 at the upper and lower peripheries and a shaft 362 to which a bevel gear $g16$ is secured as shown in FIG. 8.

A block 37 having a groove 371 and an inclined surface 372 is secured to the bottom plate 32. The purpose of block 37 is to cover and protect bevel gear $g'16$ and to engage a mounting mechanism IV, described later, to firmly hold the recording paper container III when it is mounted in frame II. The container is also provided with a door 38 mounted on a pivot shaft 381. FIG. 9 shows the door 38 in the partially opened condition. Clamping members 382 and 383 are secured to the outer end of the door for holding the recording paper. The partition plate 351 divides the space bounded by the upper and lower plates 31 and 32 and guide 33 into two compartments $R_1$ and $R_2$. The former contains the not yet recorded portion of the folded recording paper whereas the latter the recorded portion. In this embodiment, door 38 is made of a transparent plastic to enable to observe from outside the recording and folded state of the recording paper. Clamping members 382 and 383 are formed with grooves 384 and 385, respectively, which receive sprocket teeth 361 when the door 38 is closed. Latches 311 and 321 for locking the door are secured to the upper and lower plates 31 and 32, respectively, by two rivets 312, 313 and 322 and 323, respectively. The free ends 314 and 324 of the latches are bent into letter L configuration so that the bent ends are received in V-shaped grooves 386 and 387 (the groove 387 is not shown) formed on both sides of the door 38. A second elongated roller 343 is provided between clamping members 382 and 383 while a third roller 344 is formed coaxial with pivot shaft 381 of the door to oppose a fourth roller 345 (see FIG. 9).

Referring again to FIG. 5, there is shown a mounting mechanism IV for the recording paper container III. The mounting mechanism IV is mounted on the back of the base 21 and its construction is shown in FIG. 10.

Figure 10:
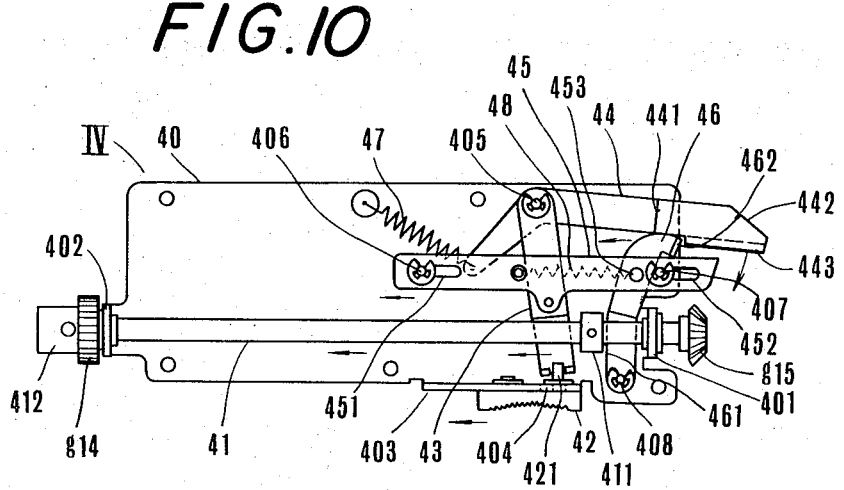

As shown in FIG. 10, the mounting mechanism IV comprises a plate 40 having lugs 401, 402 and 403 bent upwardly at right angles to the plane of the sheet of drawing. The plate 40 is secured to the back of base 21 with a definite gap therebetween which receives various elements to be described hereunder. More particularly, a motion transmission shaft 41 is rotatably and axially slidably supported by bent-up lugs 491 and 402. The shaft 41 carries a bevel gear $g15$ at its right hand end, a collar 411 at an intermediate point, a spur gear $g14$ near the left hand end and a boss 412 provided with a thrust bearing as its inner surface. A knurled knob 42 is secured to beat-up lug 403 and a pin 421 secured to knob 42 extends through an elongated slot 404 formed through lug 403 to be movable therein to the left and right as viewed in FIG. 10.

The mounting mechanism IV further includes a driving lever 43 having one end engaged with pin 421 and the other end pivotally mounted on a pivot pin 405 secured to plate 40. A crank lever 44 is also rotatably mounted on pivot pin 405 at its knee. The right hand end of crank lever 44 is bent upwardly as viewed in FIG. 10 to form oppositely inclined surfaces 442 and 443, the latter cooperating with inclined surface 372 of block 37 of the recording paper container III. Further, there is provided a lever 45 having slots 451 and 452 engaging pins 406 and 407, respectively, secured to plate 40 and a swinging arm 46 rotatably mounted on pin 408. The lever 45 and arm 46 are interconnected by a cross pin 453. The crank lever 44 is biased in the clockwise direction by means of a spring 47 and lever 45 is connected to pin 407 through a spring 48.

When knob 42 is moved to the left as viewed in FIG. 10, level gear $g15$, edge 441 of crank lever 44 and the right hand end of lever 45 are removed from or inserted into the wedge shaped notch 211 of base 21. As shown in FIG. 5, a pressure applicator 49 comprising a mounting fixture 491 secured to base 21, a spring 492, an adjustable screw 493 and a center piece 494 is provided to the left of motion transmission shaft 41 in such a manner that the center piece 491 is normally engaged with boss 412 for biasing shaft 41 to the right as viewed in FIG. 5.

Figure 11:
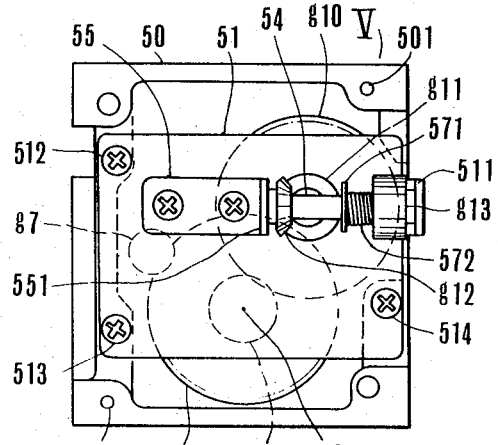
Figure 12:
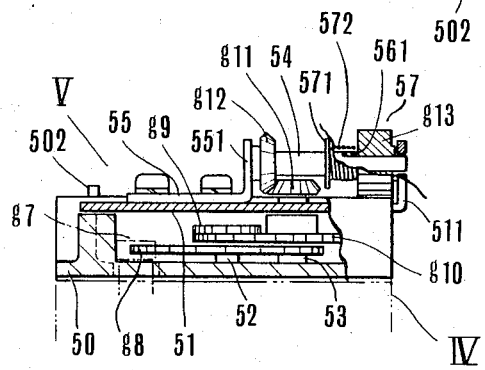

As shown in FIGS. 11 and 12, the second gear mechanism V of the torque transmission device comprises a frame 50 having pins 501 and 502 at the bottom. The frame 50 is shaped by die casting, for example, and takes a form of a box with the major portion of the bottom thereof removed. A base plate 51 having a beat-up lug 511 is secured to the lower surface of frame 50 by means of screws 512, 513 and 514. Two rotary shafts 52 and 53 are freely supported by frame 50 and base plate 51. Shaft 52 carries gears $g8$ and $g9$ whereas shaft 53 gears $g10$ and $g11$. A horizontal shaft 54 is supported between beat up lug 511 and a bent up lug 551 of letter L-shaped plate 55 secured to base plate 51. A gear $g13$ having a considerable length and a sleeve 561 is freely mounted on the reduced diameter portion of shaft 54 and a bevel gear $g12$ is secured to the opposite end of shaft 54 to mesh with bevel gear $g11$. Gear $g13$ is mounted to oppose gear $g14$ of the mounting mechanism IV. Shaft 54 is also provided with a collar and a spring clutch 57 disposed between opposing surfaces of the sleeve 561 of gear $g13$ and shaft 54, the spring clutch 57 comprising a helical coil 572 of a metal wire of a small resiliency and having an inner diameter slightly smaller than the outer diameters of sleeve 561 and shaft 54. When gear $g13$ (or shaft 54) is driven in a direction opposite to the direction of winding of coil 572, the spring clutch is tightened to transmit the torque to shaft 54 (or gear $g13$) whereas when the gear 13 (or shaft 54) is driven in the opposite direction, the spring clutch is loosened to interrupt transmission of torque to the other member. Frame 50 containing various elements described above is secured to base 21 to form the second gear mechanism unit V. The mechanism is constructed such that when pins 501 and 502 are inserted in openings 212 and 213 (see FIG. 3) frame 50 is automatically mounted on base 21 in a predetermined position.

FIGS. 13 and 14 show the construction of the first gear mechanism VI. This mechanism is also fabricated as a unit identical to the second gear mechanism unit V and comprises a frame 60, a base plate 61 secured thereto by means of screws 611 to 614 and shafts 62, 63 and 64 disposed between frame 60 and base plate 61. Shaft 62 carries gears $g2$ and $g3$, shaft 63 gears $g4$, $g5$ and $g51$ and shaft 64 gears $g6$, $g61$ and $g7$. Gear $g2$ serves as the input gear for the first gear mechanism and gear g7 meshing gear g8 of the second gear mechanism V serves as the output gear. Gears g5 and g51 are interconnected by a sleeve 65 which is secured to shaft 63 by means of a set screw 631. Thus when, the screw 631 is loosened gears, g5 and g51 can slide along shaft 63. It is possible to rotate sprocket wheel 36 at the same speed for sources of different frequencies (for example, 50 and 60 $H_z$s) by disengaging gears g5 and g6 and meshing gears g51 and g61. The driving motor is designated by a reference numeral is in FIGS. 2 and 3 and is securely mounted on frame 61 of the first gear mechanism VI by means of screws 111 and 112. In this embodiment, as driving motor 11 is used a synchronous motor equipped with a speed change mechanism which can vary the speed at a ratio of 1:60 upon reversal of the rotation of the motor.

Referring now to FIG. 15, the movable member of a pen mechanism VII is generally designated by 70 and comprises a metal frame 71, a main body 72 and a pipe assembly 73. As shown in FIG. 18, the pipe assembly comprises a thick and pointed pipe 731 for mounting, a L-shaped outlet pipe 732, an inlet pipe 733 and a pressurizing pipe 734, the latter two pipes having the same configuration. Frame 71 is formed by bending a metal plate while main body 72 is made of a hard molded synthetic resin. The main body 72 is unitary bonded to the frame 71 by the pipe assembly 73. The movable body 70 is mounted on inner frame II by inserting a supporting rod 272 and an auxiliary rod 273 which are secured between base 21 and bridging plate 27 of the inner frame II into an opening 721 and a U-shaped slot 722.

FIGS. 22 to 24 show a cartridge-type ink container made of a soft synthetic resin for example. The container is generally rectangular and has a raised ridge 741 at its upper surface which is used for mounting the container. The raised ridge is provided with an opening 742 to snugly receive the mounting pipe 731 of the pen mechanism VII. Beneath opening 742 is formed an opening 743 for receiving the lower end of outlet pipe 732 when the ink container 74 is mounted on the movable container 70. A horizontal ink passage 744 is provided to extend through the bottom of the ink container with one end communicated with opening 743 and the other end 745 opening to the deepest portion of the container 74 at the rear portion of the bottom thereof (that is on the rear bottom side of the measuring instrument).

FIGS. 19 to 21 show the construction of the recording pen 75. As shown, the recording pen comprises a pen hlder 751 of metal, a letter L-shaped pen 752 made of a thin pipe of metal such as stainless steel, and a target 753 secured to the outer end of pen 752. The pen holder 751 is provided with a U-shaped member 754 which is adapted to embrace one end 723 of the main body 72 of the pen mechanism VII and the pen pressure can be adjusted by adjusting a screw 755.

As shown in FIGS. 4 and 5, a pen arm 76 is provided which is freely mounted on a shaft 281 secured to a upright plate 28 of the inner frame II. As shown in FIG. 4, two fine metal tubes 761 and 762 are connected to arm 76 by spot welding or soldering to extend in parallel therewith. A T-shaped pin 763 is mounted upon the free end of arm 76, as shown in FIG. 5, for engaging key hole shaped opening 723 of the main body 72 of the pen mechanism VII (FIG. 15). An adjusting arm 764 (FIG. 4) is rotatably mounted on shaft 281 through a ball bearing, for example, so as to rotate an adjusting screw 765. Adjusting arm 764 is normally biased in the counterclockwise direction by means of a spring 766' connected to upright plate 28. The right hand end of pen arm 76 is formed with a sector gear 767 engaging the threads of adjusting screw 765 so that it is possible to adjust the relative angle between pen arm 76 and adjusting arm 764 by turning screw 765. A link 768 connected to a movable arm of a balancing unit (not shown) disposed on the rear side of the measuring instrument is adjustably connected to adjusting arm 764.

As shown in FIGS. 2 and 3, an ink pressurizing squirt 77 is provided and an ink tank 78 having a squirt 781 is mounted on a mounting fixture 214 of base 21 as shown in FIGS. 3 and 5. Both squirts 77 and 781 are made of an elastic material such as natural rubber or synthetic resin and are provided with air holes 771 and 782, respectively. Ink pot 78 is connected to metal pipe 762 of pen arm 76 through a thin ink pipe pl of vinyl whereas squirt 77 to metal pipe 761 through an air pipe p2. Metal pipe 762 is connected to inlet pipe 733 through an ink pipe p5 whereas metal pipe 761 is connected to pressurizing pipe 734 through an air pipe p4. Also an ink pipe p3 is provided for interconnect pen 752 and outlet pipe 732. The illustrated recording instrument is of the dual pen-type so that the pen mechanism VII is provided with another set of recording system comprising movable body 70, pen arm 76, etc., above described. However, since this another recording system has the same construction as the described system its various elements are designated by corresponding primed reference charactors.

Various component elements of the novel recording instrument operate as follows.

Mounting of Recording Paper Container III and Loading of the Recording Paper

When inner casing II is pulled out of casing I and the upper portion of cover 20 is pulled toward front side, cover 20 will be disengaged from spring clip 271. Then the cover can be rotated in the counterclockwise direction as viewed in FIG. 1 about pivot pins 201 and 202 to expose the front end of inner frame II. Then knob 42 is moved to the left from the position thereof shown in FIGS. 3 and 10 to rotate lever 43 in the clockwise direction about pin 405 whereby lever 45 is moved to the left as shown by an arrow together with lever 43. Leftward movement of lever 45 disengages its right hand end from block 37 of the recording paper container III. This movement of lever 45 also rotates arm 46 connected thereto by pin 453 in the counter clockwise direction about pin 408. Then, the left hand side of arm 46 urges collar 411 on motion transmission shaft 41 to move it to the left. As the upper end of arm 46 moves to the left of the bent-up portion 441 of crank lever 44, the lever 44 is disengaged from arm 46. Accordingly, under the resiliency of coil spring 47, the crank lever 44 applies a downward pressure (as viewed in FIG. 2) upon the recording paper container III loaded in the inner frame III. Consequently, container III is rotated in the clockwise direction about pins 221 and 222 as shown by arrow a to the position shown by dot and dash lines. Then, the container III can be withdrawn from the inner frame II by pulling it to the right and lower.

Then door 38 of the recording paper container III removed from inner frame II as above described is opened to insert a folded and not yet recorded recording paper in the left hand compartment $R_1$. A predetermined length of the leading end of the folded recording paper 30 in compartment $R_1$ is payed out and passed through a gap between the third and fourth rollers 344 and 345, then passed around the first roller 341 and over guide 33. Perforations on both sides of the recording paper 30 are fit on teeth 361 of sprocket wheel 36 and the leading end of the recording paper is admitted into right hand compartment $R_2$. Then door 38 is closed, thus completing the loading operation of the recording paper in its container III (see FIG. 9).

Then the loaded container III is brought to the dot and dash position shown in FIG. 2 so as to engage its U-shaped notches 315 and 325 with pins 221 and 222. Then, pressure is applied to the opposite end of container III to actuate mounting mechanism IV thus positively loading the container in the inner frame II. More particularly, upon loading of container III in frame II, the block 37 is inserted in notch 211 of base 21 whereby crank lever 44 is rotated in the counterclockwise direction as viewed in FIG. 10 to disengage arm 46 from bent-up portion 441. Then motion transmission shaft 41 and elements associated therewith are restored to the position shwon in FIG. 10 by the actions of spring 48 and pressure applicator 49 shown in FIG. 5 thus causing lever 45 to engage groove 371 of block 37 and bevel gear $g15$ to mesh with bevel gear $g16$. At this time the inner end (left hand side as viewed in FIG. 2) of the recording paper container III is urged downwardly by spring 223 of lower pin 222 (FIG. 3) through lower plate 32. The outer end (right hand end as viewed in FIG. 2) of the recording paper container III is firmly held against base 21 because the lower inclined surface 443 of crank lever 44 (FIG. 10) of the mounting mechanism IV is engaging the inclined surface 372 of block 37 (FIG. 8) of the recording paper container III. Consequently, wherever the container III is mounted in the inner frame II, the container will always be positioned in the predetermined position, thus establishing a definite relationship between recording paper and pens 752 and 752'. This obviates the error in the record due to mechanical errors.

Operation of the Motion Transmission Device

As gear $g1$ of driving motor 11 is rotated, its torque is transmitted to output gear $g7$ from input gear $g2$ of the first gear mechanism VI through gear $g3$ on shaft 62, gears $g4$ and $g5$ on shaft 63 and gear $g6$ on shaft 64. Rotation of gear $g7$ is transmitted to horizontal shaft 54 through gears $g8$ and $g9$ on shaft 52, gear $g10$ on shaft 53 and bevel gears $g11$ and $g12$ of the second gear mechanism V. Rotation of shaft 54 operates spring clutch 57 to drive wide gear $g13$ in the sme direction which in turn drives the motion transmission shaft 41 through gear $g14$. The torque transmitted to shaft 41 drives the sprocket wheel 36 on the fore side of the instrument via bevel gear $g15$ and the last stage gear $g15$. When loading the recording paper 30 in its container III, the sprocket wheel 36 is often rotated manually. In such a case, spring clutch 57 is released to prevent the torque from being transmitted to the motor side from sprocket wheel 36.

As described above, in this embodiment, a synchronous motor with a variable speed device used as the driving motor 11 is so designed that its output number of rotations can be varied in a constant rotational direction in two steps, 1 r.p.m. or 60 r.p.m., by rotating the driving motor 11 in the forward or backward direction, respectively. The output gear $g_1$ of motor 11 is designed to have 13 teeth, while gears $g_2$ through $g_7$ of the first gear mechanism VI are designed to have 52, 13, 52, 48, 40 and 13 teeth, respectively. Gears $g_8$, $g_9$ and $g_{10}$ of the second gear mechanism V have 65, 21 and 65 teeth, respectively, and are followed by a plurality of pairs of gears $g_{11}$ and $g_{12}$, $g_{13}$ and $g_{14}$, and $g_{15}$ and $g_{16}$ each having the same number of teeth. As a result, the two gear mechanisms VI and V enable the driving motor 11 to be decreased in its output number of rotations by 1/200, so that the recording paper 30 is fed at speed of 20mm/min. or 20mm/hour in accordance with the two different output rotation numbers of the driving motor 11, 1 r.p.m. and 60 r.p.m.

Further, in addition to the conventional synchronous motor described above, there may be provided pulse motors energized by a DC source of 24 volts and each having output speed of 4.5/60 r.p.m. or 4.5 r.p.m. In the application of the present recording instrument to a control apparatus for electronic computers, the output shaft of such pulse motor is fixedly provided with a gear of 13 teeth corresponding to the gear $g_7$ set forth. All the steps needed in this case are to remove the first gear mechanism VI from the second gear mechanism V and then to equip the pulse motor on the second gear mechanism V directly. As a result, the output speed of the pulse motor is decreased by 1/15 and thus the feed speed of the recording paper can be maintained at 20mm/min. or 20mm/hour, just like the case where a synchronous motor is used, dependent upon either application of the pulse motor having the speed of 4.5/60 r.p.m. or 4.5 r.p.m. In the result, the combination of the first and second gear mechanisms VI and V is applied to a synchronous motor, whereas the second gear mechanism V along to each of the pulse motors, thereby assuring the constant feed speeds of the recording paper 30. As described above, the recording instrument according to the present invention, operable under both the commercial AC 100 volt source and a DC 24 volt source through easy exchange operation, is available for many applications and suitable for practical use.

Folding Operation of the Recording Paper

As above described, when the recording paper container III is mounted in inner frame II, the torque of motor 11 is transmitted to the container II and the sprocket wheel 36 is rotated in the direction of the arrow shown in FIG. 3, to pay out the not yet recorded recording paper 30 continued to compartment $R_1$ layer after layer. At this time, folds $30a$ and $30b$ are successively opened by the third and fourth rollers 344 and 345. Then, as shown by dot and dash lines in FIG. 9, the recording paper 30 is fed around first roller 341 and along the outsides of the guide 33. Meanwhile, curves L and L' representing measured values are recorded by pens 752 and 752'. Finally, the leading end of the recording paper 30 comes to the periphery of sprocket wheel 36 to pass through a gap between clamping members 382 and 383 on the opposite sides of sprocket 36 and door 38. While the recording paper 30 is advanced in close contact with the outer periphery of the sprocket wheel 36 which is assured by the second roller 343, the paper is acted upon by depression 352 and projection 353 of the controlling member comprising frame 35 and is then sent into compartment $R_2$ with a predetermined configuration afforded thereto by the controlling member. The recording paper 30 introduced into compartment $R_2$ is forcibly folded therein.

FIGS. 25A to 25D show the manner of folding. More particularly, a fold 30a of the recording paper 30 has a tendency to move away from the sprocket wheel 36 whereas another fold 30b has a tendency to approach the sprocket wheel. Assuming now that the fold 30a passes over sprocket wheel 36 the fold 30a will be bent in the opposite direction by the depression 352 of frame 35 and then restored to the original condition by the action of projection 353. As a consequence, as the fold 30a leaves projection 353, the fold will be subjected to a force in a direction tangential to the arcuate loci defined by the corporation of the depression 352 and projection 353 and is forced to move in this direction as shown by an arrow $F_1$ in FIGs. 25A and 25B. Thus, the recording paper 30 is sent to the bottom of compartment $R_2$ while gradually decreasing angle of fold $\theta$ at the fold 30a, thus forcibly folded. On the other hand, another fold 30b bent in the opposite direction passes over projection 353, the portion of the paper between adjacent folds 30a and 30b extends in an arcuate path and the tension of this portion of the paper cooperates with the above described tendency at the folds to apply a force $F_2$ to the paper whereby the fold 30b is forced to the top of compartment $R_2$ as shown in FIGS. 25C and 25D. Thus, the recording paper 30 is sent in the direction of $F_2$ and is forcibly folded while gradually decreasing folding angle $\theta$. When the next fold 30a passes over projection 353, the operation already described in connection with FIGS. 25A and 25B will be repeated. By repeating this cycle of operation, the recording paper 30 is neatly folded in compartment $R_2$.

Operation of the Pen Mechanism VII

As the quantity to be measured varies, the shaft of the balancing unit, not shown, is rotated. Rotation of this shaft is transmitted to pen area 76 through link 760 and adjusting are 764 to rotate pen arm 76 about pin 281 whereby pin 763 on the outer end of pen arm 76 causes the movable body 70 to move along supporting rod 272 and auxiliary rod 273 in the vertical direction, as best shown in FIG. 4. Target 753 secured to pen 752 indicates the measured quantity on scale 261. The ink in container 74 is sucked upwardly from communication end 745 through ink passage 744, opening 743 and outlet pipe 732 and is then supplied to pen 752 via ink pipe p5. The pen 752 contacts against recording paper 30 at the recording portion formed by guide 33 to describe curve L representing the measured quantity having the same value as indicated by scale 261. Where the supply of the ink is interrupted by some reason, the squirt 77 is depressed with its air opening closed to compress the air contained therein. The pressurized air applies pressure upon the level of the ink is container 74 through air pipe p3, metal pipe 761 and air pipe p4. Accordingly, the ink in container 74 is gradually fed to pen 752 to supplement ink. When the ink in ink container 74 is completely consumed, the empty ink container 74 is removed from movable body 70 and a new ink container filled with the ink is inserted into pipe 731 from the under side of movable body 70. Where a new ink container is not available, the squirt 781 of ink pot 78 is depressed in the same manner as squirt 77 to supplement the ink in pot 78 into ink container 74 through ink pipe p1, metal pipe 762, ink pipe p4 and inlet pipe 733.

As above described, since the pen mechanism is constructed such that the ink is sucked up to pen 752 from the communication end 745 which is disposed near the rear bottom side of the instrument when the ink container 74 is mounted on the movable body 70, the communication end 745 will be always positioned at the lowest portion of ink container 74 not only when the instrument is mounted on a vertical panel board but also when the instrument is mounted on an inclined panel board facing upwardly. Furthermore, according to this embodiment, as the supporting point of ink container 74 is located close to supporting rods 272 and 272' adapted to support the movable body 70, it is possible to decrease the moment of inertia due to the weight of ink container 74, thus assuring smooth operation of movable body 70. In addition, exchange and supplement of the ink can be made very readily.

Figure 26:
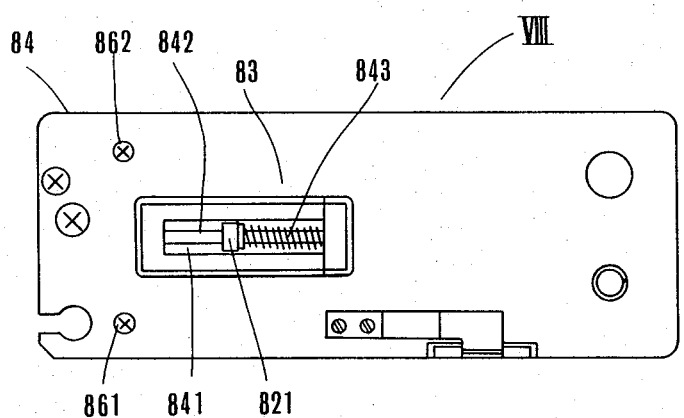
FIG. 26 shows an upper view of a modified recording paper container.
Figure 27:
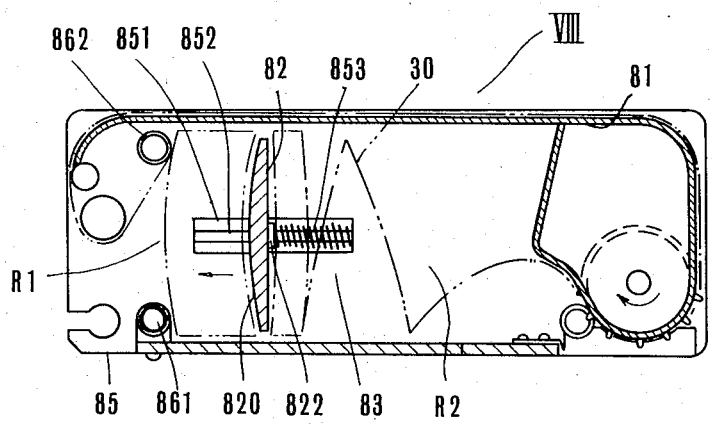
FIG. 27 shows a longitudinal sectional view of the container shown in FIG. 26.

FIGS. 26 and 27 illustrate another form of the recording paper container VII, which is generally identical to container III described above except that frame 35 is omitted, that guide plate 81 is being extended to provide the function of frame 35 and that partition wall 82 is modified. Partition wall 82 is supported by supporting means 83, and the upper plates 84 and 85 are formed with rectangular perforations 841 and 851 respectively containing circular rods 842 and 852 surrounded by compression springs 843 and 845. Partition wall 82 is supported by rods 842 and 852 loosely extending through openings at it upper and lower ends 821 and 852, respectively. One side surface 920 of partition wall 82 is finished as an arcuate surface.

Due to this arcuate configuration and by the force of compression springs 843 and 853, consecutive layers of the not yet recorded paper 30 contained in compartment $R_1$ are laminated in an arcuate condition. As a result, it is possible to smoothly pay out the recording paper from the compartment $R_1$. As the layers of the paper are successively payed out, the partition wall 82 is gradually moved to the left by the action of springs 843 and 853. In this manner, according to this modified embodiment as the volume of both compartments $R_1$ and $R_2$ vary in accordance with the decrease and increase in the volume of paper contained therein, it is possible to decrease the overall length of the container.

While the invention has been shown and described in terms of preferred embodiment thereof it will be clear that many changes and modifications will occur to one skilled in the art without departing from the true spirit and scope of the invention to defined in the appended claims.

What we claimed is:

1. A recording instrument comprising driving means, a continuous web of recording paper which is folded in many folds before and after recording, means driven by said driving means for continuously feeding said recording paper in an unfolded condition, and means for recording a measured quantity on said recording paper while it is unfolded, said recording means comprising a pen arm rotated in accordance with said measured quantity, a pipe assembly, a movable body and a pen mounted on one end of said pen arm, a supporting rod along which said movable body is slidable a cartridge type ink container removably inserted into an opening of said movable body and connected to said pen by a portion of said pipe assembly, an ink pot connected to said ink container through another portion of said pipe assembly, and means for supplementing ink to said ink container from said ink pot through said pipe assembly.

2. The recording instrument according to claim 1 wheerein there is provided a passage in said ink container, one end of said passage being adapted to be communicated with said pen via said pipe assembly and the other end of said passage opening in the rear bottom side of said container so that even when said recording instrument is mounted on an inclined panel board facing upwardly said other end of said passage occupies the lowest portion of said ink container.

3. The recording instrument according to claim 1 wherein said movable body receives said supporting rod in an opening formed near said ink container so as to minimize the moment of inertia caused by the weight of said container applied to said supporting rod when said ink container is mounted on said instrument.

4. A cassette-type recording instrument for a Z-folded paper stack comprising: a frame, torque generating means and torque transmission means on said frame; a cassette removably mounted on said frame, said cassette having: a housing enclosing a rectangular volume with internal dimensions corresponding to the sheet size of said stack and subdivided by a transverse wall to define first and second internal regions having said internal dimensions to accept and confine the edges of separate stacks of Z-folded paper, recording paper feed means at one end of said housing, said recording paper feed means being cooperatively connected to said torque transmission means when said cassette is mounted on said frame as as to be rotated, a turning guide at the other end of said housing positioned to guide a continuous web of Z-folded recording paper which is stored in said first internal region of said cassette and engaged with said recording paper feed means so as to be drawn from said first region over said turning guide and fed in an unfolded condition over the outer surface of said cassette, deflecting guide means mounted at said one end of said housing and forming an end wall for said second region adjacent said feed means, said end wall forming a slot through which said feed means propells said web through said slot to be projected past said deflecting guide approximately normal to the surface of said transverse wall and refolded within said second region solely by the force of projection through said slot; and means mounted on said frame at a position opposed to said outer surface for recording a measured quantity on the recording paper while it is unfolded.

5. A recording instrument of the type comprising torque generating means, torque transmission means, a rectangular container removably mounted on the instrument and supporting at one end a sprocket wheel cooperatively connected to said means for transmitting the torque when said container is mounted on said instrument so as to be rotated, said container adapted to accommodate a continuous web of Z-folded recording paper which is folded before and after recording and engaged with said sprocket wheel so as to be fed in an unfolded condition, said container enclosing a rectangular volume with the internal dimensions corresponding to the sheet size of said Z-folded recording paper and subdivided by a transverse wall to define a first storing compartment adapted to store and confine the edges of a stack of the not yet recorded portion of said recording paper in a folded condition and a second housing compartment adapted to house and confine the edges of a stack of the recorded portion of said recording paper in a refolded condition, said first compartment being at the other end of said container and said second compartment being aligned between said first compartment and said sprocket wheel and separated from said sprocket wheel by a deflection guide, and a guide plate member adapted to define a feed path for the recording paper which is fed by means of said sprocket wheel from said storing compartment along said guide plate member, said deflection guide forming a slot through which said recording paper is projected into said housing compartment approximately normal to said transverse wall, said paper being folded after recording solely by force of projection thru said slot, a portion of said guide plate being on the opposite side of said paper at a recording position in said feed path; and a pen on said instrument operative for recording a measured quantity on said recording paper in said unfolded condition at said recording position.

6. The recording instrument according to claim 5 wherein there are provided a block with an inclined surface secured to said recording paper container and a mounting mechanism having a crank lever with an inclined surface cooperating with said inclined surface of the block such that the inclined surface of said block may be forcibly engaged with the inclined surface of said crank lever to bias said recording paper container towards its predetermined mounted position in said instrument as said container is mounted.

7. A recording instrument of the type comprising torque generating means, torque transmission means, a sprocket wheel cooperatively connected to said means for transmitting the torque so as to be rotated, a continuous web of recording paper which is folded before and after recording and engaged with said sprocket wheel so as to be fed in an unfolded condition, and a pen for recording a measured quantity on said recording paper in an unfolded condition, characterized in that there is provided a container for accommodating the recording paper which includes a movable partition wall interposed between and defining a storing compartment and a housing compartment containing said paper before and after recording respectively, said movable partition wall being supplied with a resilient force by a spring to be biased toward said storing compartment so as to vary the volumes of said storing and housing compartments in accordance with the decrease and increase in the volume of said recording paper within said storing and housing compartments, respectively, 8. The recording instrument according to claim 7 wherein said means for transmitting the torque includes a gear mechanism for changing the speed of said means for generating torque and a transmission shaft having one end connected to the output of said gear mechanism and the other end removably connected to said recording paper container and adapted to rotate said sprocket wheel within said container, whereby the speed of said means for generating torque changed by said gear mechanism is transmitted through said transmission shaft to drive the sprocket wheel in said recording paper container.

9. The recording instrument according to claim 8 wherein said gear mechanism comprises first and second gear mechanism units, said first gear mechanism unit being removable, the combination of said first and second gear mechanism cooperating with torque generating means of one type to produce the same output speed as said second gear mechanism produces when cooperating with torque generating means of another type with said first gear mechanism removed.

* * * * *

UNITED STATES PATENT AND TRADEMARK OFFICE
CERTIFICATE OF CORRECTION

PATENT NO. : 3,864,694
DATED : February 4, 1975
INVENTOR(S) : Sadao Tamura

It is certified that error appears in the above-identified patent and that said Letters Patent are hereby corrected as shown below:

Column 1, line 15, "hss" should be -- has --
Column 2, line 46, "fo" should be -- of --
Column 3, line 9, "is" should be -- in --
Column 5, line 53, "491" should be -- 401 --
Column 5, line 58, "beat" should be -- bent --
Column 6, line 27, "beat" should be -- bent --
line 33, "beat" should be -- bent --

Column 9, line 23, "shwon" should be -- shown --
line 51, "sme" should be -- same --
Column 11, line 36, "area" should be -- arm -- line 53, "is" should be -- in --

Column 12, line 48, "to" should be -- as --
Column 13, line 2, "wheerein" should be -- wherein --.

Signed and Sealed this thirteenth Day of April 1976

[SEAL]

Attest:

RUTH C. MASON
*Attesting Officer*

C. MARSHALL DANN
*Commissioner of Patents and Trademarks*